United States Patent

Kondo et al.

[11] Patent Number: 5,853,896
[45] Date of Patent: Dec. 29, 1998

[54] WATER REPELLENT AGENT FOR GLASS

[75] Inventors: Hidetoshi Kondo; Atsushi Sakuma, both of Chiba Prefecture, Japan

[73] Assignee: Dow Corning Toray Silicone Co., Ltd., Tokyo, Japan

[21] Appl. No.: 819,245

[22] Filed: Mar. 17, 1997

[30] Foreign Application Priority Data

Mar. 29, 1996 [JP] Japan ..................................... 8-104264

[51] Int. Cl.$^6$ ............................. B32B 17/10; C03C 17/30
[52] U.S. Cl. ......................... 428/429; 427/165; 427/168; 427/387; 427/389.7; 428/447; 528/33; 528/34
[58] Field of Search .................. 428/429, 447; 427/163.1, 165, 168, 387, 389.7; 528/33, 34

[56] References Cited

U.S. PATENT DOCUMENTS

| | | | |
|---|---|---|---|
| 4,765,729 | 8/1988 | Taniguchi | 351/163 |
| 5,580,819 | 12/1996 | Li et al. | 427/167 |

FOREIGN PATENT DOCUMENTS

| | | |
|---|---|---|
| 02-233535 | 9/1990 | Japan . |
| 04-144940 | 5/1992 | Japan . |

Primary Examiner—D. S. Nakarani
Attorney, Agent, or Firm—Alex Weitz

[57] ABSTRACT

The present invention relates to a water-repellent composition for a vehicle window glass which does not cause corrosion of metal components such as wipers, said composition being prepare by mixing:

(A) 100 parts by weight of an organosilane having the formula $$R^1_a SiX_{(4-a)}$$

wherein $R^1$ is a monovalent hydrocarbon group having 3 to 20 carbon atoms, X is a hydrolyzable group and a is an integer having a value of 1 to 3; and (B) 10 to 1,000 parts by weight of a diorganopolysiloxane having a viscosity of 0.65 to 500 centistokes at 25° C. and having the formula $$\begin{array}{c} R^2 \quad R^2 \quad R^2 \\ | \quad\quad | \quad\quad | \\ HO-SiO-(SiO)_n-Si-OH \\ | \quad\quad | \quad\quad | \\ R^2 \quad R^2 \quad R^2 \end{array}$$

wherein $R^2$ is a monovalent hydrocarbon group having 1 to 6 carbon atoms and n is an integer having a value greater than 0, said composition being free of acid having an acid dissociation index (pKa) below 5.0.

19 Claims, No Drawings

WATER REPELLENT AGENT FOR GLASS

FIELD OF THE INVENTION

The present invention relates to a water-repellent agent for glass used in a vehicle and to a glass having water-repellent properties. More specifically, the invention relates to a water-repellent composition which facilitates downward flow of water drops which adhere to the glass so that normal visibility through the glass is not obscured. The aforementioned composition does not cause corrosion of metal material along the edge of the glass. The invention particularly relates also to a water-repellent glass which is treated with the aforementioned composition.

BACKGROUND OF THE INVENTION

Water-repellent agents for glass comprising an organosilane having a perfluoroalkyl group, an organopolysiloxane, and an acid are known (see Japanese Laid-Open Patent Applications 2-233535 and 4-144940). However, since such compositions contain sulfuric acid, hydrochloric acid, aromatic sulfonic acid, aliphatic sulfonic acid, halogenated sulfonic acid, phosphoric acid, chloroacetic acid, phosphorus pentachloride, or a similar acid which causes corrosion of metals, they are unsuitable for use in vehicle window glass applications wherein there is contact between the glass and wipers or other metal parts. Further, the glass treated with the aforementioned composition has a high contact angle with water and it demonstrates good water-repellent properties. However, when water on the treated surfaces turn into beads these adhere to the surface and tend not to flow. Therefore, when the aforementioned composition is applied to a vehicle window glass and the vehicle is driven at high speed in rainy weather (i.e., when drops of water collide with the surface of the glass) it is difficult to ensure clear vision. Especially large number of water drops (per unit surface) will adhere to the glass without flowing and, therefore, obscure visibility over a long period of time when the drops result from a mist.

SUMMARY OF THE INVENTION

An object of the invention is the elimination of disadvantages of the above cited prior art. More specifically, it is an object of the present invention to provide a water-repellent agent for vehicle glass which improves flowability of water drops adhered to the surface of the glass and thus improves visibility through the glass. Unlike the above prior art agents, this composition does not cause corrosion of metal material on the edges of the glass.

The present invention relates to a water-repellent agent for glass used in a vehicle, said agent comprising:

(A) 100 parts by weight of an organosilane represented by the following formula: $R^1_a SiX_{(4-a)}$ wherein $R^1$ is a monovalent hydrocarbon group having 3 to 20 carbon atoms, X is a hydrolyzable group, and a is an integer having a value of 1 to 3; and (B) 10 to 1,000 parts by weight of diorganopolysiloxane which at 25° C. has a viscosity of 0.65 to 500 centistokes and is represented by the following general formula:

wherein $R^2$ is a monovalent hydrocarbon group having 1 to 6 carbon atoms, and n is an integer which is greater than 0, said composition being free of acid having an acid dissociation index (pKa) below 5.0.

The invention also relates to a vehicle glass having water-repellent properties acquired as a result of treating its surface with the aforementioned water-repellent composition.

The present invention has been disclosed in Japanese Patent Application Number Hei 08/104264, the full disclosure of which is hereby incorporated by reference.

DETAILED DESCRIPTION OF THE INVENTION

The organosilane (A) of the water-repellent composition of the invention is represented by the following general formula:

$$R^1_a SiX_{(4-a)} \quad (i)$$

where $R^1$ is a monovalent hydrocarbon group having 3 to 20 carbon atoms. The following are specific examples of such groups: a propyl group, n-butyl group, pentyl group, n-decyl group, or a similar alkyl group; a cyclohexyl group, or a similar cycloalkyl group. X in the above formula is a hydrolyzable group, preferably a methoxy group, ethoxy group, propoxy group, or a similar alkoxy group. However, X may also be a phenoxy group, a ketooxime group, or an isopropenoxy group. In the above formula, a is an integer having a value of 1 to 3, 1 being preferable. The following are examples of the aforementioned organosilane component: n-butyltrimethoxysilane, n-decyltrimethoxysilane, isobutyltrimethoxysilane, n-hexyltrimethoxysilane, and cyclohexylmethyldimethoxysilane. Organosilanes of the aforementioned type may be used separately or in a mixture of two or more.

The diorganopolysiloxane of component (B) suitable for use in the water-repellent composition of the present invention is represented by the following general formula:

where $R^2$ is a monovalent hydrocarbon group having 1 to 6 carbon atoms. The following are specific examples of the aforementioned group: methyl group, ethyl group, propyl group or a similar alkyl group; vinyl group, allyl group, or a similar alkenyl group; a phenyl group, or a similar aryl group. The most preferable among the above groups is a methyl group. In formula (ii) n is an integer which is greater than 0 and which, in general, is 1 to about 150. At a temperature of 25° C., the aforementioned component has a viscosity of 0.65 to about 500 centistokes, preferably between 1 and 100 centistokes. It is recommended that this component be used in an amount of 10 to 1,000 parts by weight, preferably 50 to 200 parts by weight per 100 parts by weight of component (A). If component (B) is used in an amount exceeding the above upper limit, the water-repellent properties of the composition will be reduced. This component may be represented by a dimethylpolysiloxane with dimethylhydroxysiloxy groups on both terminals, a copolymer of methylvinylsiloxane and dimethylsiloxane with dimethylhydroxysiloxy groups on both terminals of the chain, or a copolymer of methylphenylsiloxane and dimethylsiloxane with dimethylhydroxysiloxy groups on both terminals of the chain. The most preferable of these is the dimethylpolysiloxane with dimethylhydroxysiloxy groups on both terminals. The aforementioned diorganopolysiloxanes may be used separately or in a mixture of two or more.

The water-repellent composition of the present invention comprises aforementioned components (A) and (B) but it does not contain acid having an acid dissociation index in water (pKa value) below 5.0, such as sulfuric acid, hydrochloric acid, an aromatic sulfonic acid, aliphatic sulfonic acid, halogenated sulfonic acid, phosphoric acid, chloroacetic acid, and phosphorus pentachloride. In order to improve storage stability and coating properties of the composition of the present invention, it can be combined with a water-soluble organic solvent. It is recommended that such water-soluble organic solvent be miscible with water. The following are specific examples of the aforementioned organic solvents: methanol, ethanol, 2-propanol, ethylene glycol, propylene glycol, glycerol (or a similar mono or polyhydric alcohol), 2-methoxyethanol, 2-ethoxyethanol, 2-butoxyethanol, 1-methoxy-2-propanol, 1 -ethoxy-2-propanol, 2-(2-ethoxyethoxy) ethanol, (or a similar glycol ether) and a ketone. These water-soluble organic solvents can be used separately or in a mixture of two or more. It is recommended to use the aforementioned solvents in an amount of 100 to 10,000 parts by weight, preferably 600 to 9,000 parts by weight per 100 parts by weight of component (A). It is not recommended to use the composition of the present invention in combination with a condensation reaction acceleration catalyst or a similar catalyst. That is, the composition is essentially free of such a catalyst.

Various methods can be used for treating (coating) the surface of a vehicle glass with the water-repellent composition of the present invention. For example, the composition of the invention may be applied with the use of cloth or paper impregnated with this composition; the composition may be applied by spraying; it can be applied by flow coating, or by immersing the vehicle glass into it. It is recommended that, prior to treatment, the surface of the glass to be treated be cleaned with an organic solvent or a detergent. The treatment is completed when, after the application of the composition of the invention onto vehicle glass by methods mentioned above, excess composition is removed, either by wiping with cloth or paper, or by evaporation through heating.

Since the vehicle-glass water-repellent composition of the present invention does not contain acids with an acid dissociation index (pKa) in water below 5.0, it does not cause corrosion of metal and therefore is suitable for use as water-repellent agent working in conjunction with metal parts (or coated surfaces) in the vicinity of the vehicle window glass.

The vehicle water-repellent glass of the present invention is characterized by the fact that its surface is treated with the aforementioned composition. The treated vehicle glass is suitable for use as window glass of automobiles and railroad cars, automobile side mirrors, and especially automobile windshield glass.

The vehicle water-repellent glass of the present invention is characterized by an extraordinarily high flowability of water drops that adhere to the surface of the glass. Therefore, an advantage of this glass is that it facilitates flowing of rain drops and ensures clear vision in rainy weather, even when the vehicle is not moving. Such a water-repellent glass is especially suitable for use as an automobile window glass for which clarity of vision is an important factor.

EXAMPLES

The invention will be further described in more detail with reference to practical examples. The values of viscosity given in these examples were measured at 25° C.

Practical Example 1

A 150 ml glass bottle was filled with 80 g of 2-propanol, and then the contents of the bottle were combined with 10 g of n-decyltrimethoxysilane and 10 g of dimethylpolysiloxane having a 2 centistoke viscosity of the formula

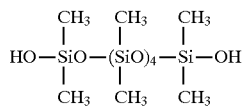

After 5 minutes of shaking, a vehicle glass water-repellent composition was obtained. Several drops of the composition were applied onto a clean glass test panel, spread as thin layer and wiped with a clean soft paper. The contact angle of a water drop on the above water-repellent glass test panel was measured using an instrument produced by Kyowa Kaimen Kagaku Co., Ltd. (trademark CA-P) by a liquid-drop method. Furthermore, a 0.2 g water drop was applied onto the surface of the aforementioned water-repellent glass test panel with the use of a pipette, and the glass was placed onto a plate having a variable angle of inclination. As the angle of inclination of the aforementioned plate was gradually increased, an inclination angle at which the drop began to move was measured. This angle was defined as the water drop falling angle. Additionally, an iron test panel was immersed into, and immediately removed from, the above water-repellent composition, and the panel was then retained outdoors for 2 days. After the two day exposure, the condition of the surface was examined with regard to any corrosive effect of the composition on the iron. The results are shown in Table 1.

Practical Example 2

A 150 ml glass bottle was filled with 80 g of 2-propanol, and then the contents of the bottle were combined with 10 g of n-butyl trimethoxysilane and 10 g of dimethylpolysiloxane having a 40 centistoke viscosity of the formula

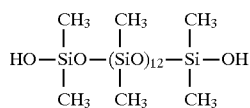

After 5 minutes of shaking, a vehicle glass water-repellent composition was obtained. A glass test panel was treated with the obtained composition in the same manner as in Practical Example 1, and the contact angle of a water drop on the obtained water-repellent glass test panel and the water drop falling angle were measured in the same manner as in Practical Example 1. Furthermore, the corrosive effect of the composition on iron was also measured by the method of Practical Example 1. The results are shown in Table 1.

Comparative Example 1

A 150 ml glass bottle was filled with 80 g of 2-propanol, and then the contents of the bottle were combined with 10 g of dimethylpolysiloxane having a 2 centistoke viscosity and of the formula

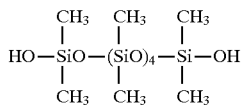

After 5 minutes of shaking, a vehicle glass water-repellent composition was obtained. A glass test panel was treated with this composition in the same manner described in Practical Example 1, and the contact angle of a water drop on the obtained water-repellent glass test panel and the water drop falling angle were measured in the same manner as in Practical Example 1. Furthermore, the corrosive effect of the composition on iron was also measured as in Practical Example 1. The results are shown in Table 1.

Comparative Example 2

A 150 ml glass bottle was filled with 80 g of 2-propanol, and then the contents of the bottle were combined with 10 g of n-butyltrimethoxysilane. After 5 minutes of shaking, a vehicle glass water-repellent composition was obtained. A glass test panel was treated with this composition as in Practical Example 1, and the contact angle of a water drop on the obtained water-repellent glass test panel and the water drop falling angle were measured as in Practical Example 1. Furthermore, the corrosive effect of the composition on iron was also measured as in Practical Example 1. The results are shown in Table 1.

Comparative Example 3

A 150 ml glass bottle was filled with 80 g of 2-propanol, and then the contents of the bottle were combined with 10 g of n-butyltrimethoxysilane, 0.5 g of a sulfuric acid (pKa value is 1.99), and 10 g of dimethylpolysiloxane having a 40 centistoke viscosity of the formula

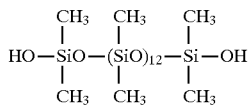

After 5 minutes of shaking, a vehicle glass water-repellent composition was obtained. A glass test panel was treated with this composition in the same manner as in Practical Example 1, and the contact angle of a water drop on the obtained water-repellent glass test panel and the water drop falling angle were measured as in Practical Example 1. Furthermore, the corrosive effect of the composition on iron was also measured as in Practical Example 1. The results are shown in Table 1.

Comparative Example 4

A 150 ml glass bottle was filled with 80 g of 2-propanol, and then the contents of the bottle were combined with 10 g of n-decyltrimethoxysilane, 0.5 g of a sulfuric acid (pKa value is 1.99), and 10 g of dimethylpolysiloxane having a 2 centistoke viscosity of the formula:

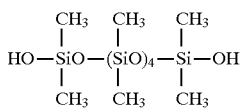

After 5 minutes of shaking, a vehicle glass water-repellent composition was obtained. A glass test panel was treated with the obtained composition in the same manner as in Practical Example 1, and the contact angle of a water drop on the obtained water-repellent glass test panel and the water drop falling angle were measured as in Practical Example 1. Furthermore, the corrosive effect of the composition on iron was also measured as in Practical Example 1. The results are shown in Table 1.

Comparative Example 5

A 150 ml glass bottle was filled with 80 g of 2-propanol, and then the contents of the bottle were combined with 10 g of n-decyltrimethoxysilane and 0.1 g of dibutyltin dioctoate, and 10 g of dimethylpolysiloxane having a 40 centistoke viscosity of the formula:

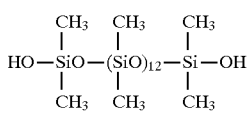

After 5 minutes of shaking, a vehicle glass water-repellent composition was obtained. A glass test panel was treated with the obtained composition in the same manner as in Practical Example 1, and the contact angle of a water drop on the obtained water-repellent glass test panel and the water drop falling angle were measured as in Practical Example 1. Furthermore, the corrosive effect of the composition on iron was also measured as in Practical Example 1. The results are shown in Table 1.

TABLE 1

| | Contact Angle (degrees) | Water Drop Falling Angle (degree) | Corrosive effect on Iron |
|---|---|---|---|
| Pract. Example 1 | 76 | 12 | No corrosion |
| Pract. Example 2 | 80 | 14 | No corrosion |
| Comparative Example 1 | 64 | 32 | No corrosion |
| Comparative Example 2 | 62 | 59 | No corrosion |
| Comparative Example 3 | 96 | 18 | Corrosion |
| Comparative Example 4 | 99 | 13 | Corrosion |
| Comparative Example 5 | 76 | 36 | No corrosion |

That which is claimed is:

1. A water-repellent composition consisting essentially of a mixture of:
    (A) 100 parts by weight of an organosilane having the formula $R^1_a SiX_{(4-a)}$ wherein $R^1$ is a monovalent hydrocarbon group having 3 to 20 carbon atoms, X is a hydrolyzable group and a is an integer having a value of 1 to 3; and
    (B) 10 to 1,000 parts by weight of a diorganopolysiloxane having a viscosity of 0.65 to 500 centistokes at 25° C.

and having the formula

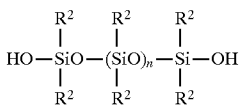

wherein $R^2$ is a monovalent hydrocarbon group having 1 to 6 carbon atoms and n is an integer having a value greater than 0,
said composition being free of acid having an acid dissociation index (pKa) below 5.0 and being essentially free of a condensation catalyst.

2. The composition according to claim 1, wherein said diorganopolysiloxane (B) has a viscosity of 1 to 100 centistokes at 25° C.

3. The composition according to claim 1, wherein said integer a is 1.

4. The composition according to claim 3, wherein said organosilane (A) is selected from the group consisting of n-butyltrimethoxysilane, n-decyltrimethoxysilane, isobutyltrimethoxysilane, n-hexyltrimethoxysilane and cyclohexylmethyldimethoxysilane.

5. The composition according to claim 4, wherein $R^2$ of said diorganopolysiloxane (B) is methyl.

6. The composition according to claim 5, wherein said diorganopolysiloxane (B) has a viscosity of 1 to 100 centistokes at 25° C.

7. The composition according to claim 1, wherein $R^2$ of said diorganopolysiloxane (B) is selected from the group consisting of methyl, vinyl and phenyl.

8. The composition according to claim 7, wherein said diorganopolysiloxane (B) has a viscosity of 1 to 100 centistokes at 25° C.

9. In a method for imparting water repellency to a glass surface, said method comprising treating at least a portion of said surface with a water-repellent agent, the improvement wherein said agent consisting essentially of a mixture of:

(A) 100 parts by weight of an organosilane having the formula

wherein $R^1$ is a monovalent hydrocarbon group having 3 to 20 carbon atoms, X is a hydrolyzable group and a is an integer having a value of 1 to 3; and (B) 10 to 1,000 parts by weight of a diorganopolysiloxane having a viscosity of 0.65 to 500 centistokes at 25° C. and having the formula

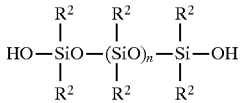

wherein $R^2$ is a monovalent hydrocarbon group having 1 to 6 carbon atoms and n is an integer having a value greater than 0, said agent being free of acid having an acid dissociation index (pKa) below 5.0 and being essentially free of a condensation catalyst.

10. The method according to claim 9, wherein said glass is a vehicle window glass.

11. The method according to claim 10, wherein said diorganopolysiloxane (B) has a viscosity of 1 to 100 centistokes at 25° C.

12. The method according to claim 10, wherein $R^2$ of said diorganopolysiloxane (B) is selected from the group consisting of methyl, vinyl and phenyl.

13. A glass article having at least one surface, wherein at least a portion of said surface is treated with a blend consisting essentially of a mixture of:

(A) 100 parts by weight of an organosilane having the formula

wherein $R^1$ is a monovalent hydrocarbon group having 3 to 20 carbon atoms, X is a hydrolyzable group and a is an integer having a value of 1 to 3; and (B) 10 to 1,000 parts by weight of a diorganopolysiloxane having a viscosity of 0.65 to 500 centistokes at 25° C. and having the formula

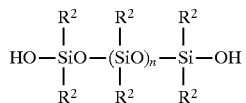

wherein $R^2$ is a monovalent hydrocarbon group having 1 to 6 carbon atoms and n is an integer having a value greater than 0,
said blend being free of acid having an acid dissociation index (pKa) below 5.0 and being essentially free of a condensation catalyst.

14. The article according to claim 13, wherein said glass article is a vehicle window glass.

15. The article according to claim 14, wherein said diorganopolysiloxane (B) has a viscosity of 1 to 100 centistokes at 25° C.

16. The article according to claim 14, wherein said integer a is 1.

17. The article according to claim 16, wherein said organosilane (A) is selected from the group consisting of n-butyltrimethoxysilane, n-decyltrimethoxysilane, isobutyltrimethoxysilane, n-hexyltrimethoxysilane and cyclohexylmethyldimethoxysilane.

18. The article according to claim 17, wherein $R^2$ of said diorganopolysiloxane (B) is methyl.

19. The article according to claim 14, wherein $R^2$ of said diorganopolysiloxane (B) is selected from the group consisting of methyl, vinyl and phenyl.

* * * * *